US009697654B2

(12) United States Patent
Asada et al.

(10) Patent No.: US 9,697,654 B2
(45) Date of Patent: Jul. 4, 2017

(54) SYSTEM FOR MANAGING MINING MACHINE AND METHOD FOR MANAGING MINING MACHINE

(71) Applicant: Komatsu Ltd., Tokyo (JP)

(72) Inventors: Hisashi Asada, Yokohama (JP); Kenji Doishita, Isehara (JP); Dai Tsubone, Kawasaki (JP); Tetsuya Akiyama, Kawasaki (JP); Ryomei Kurokawa, Musashino (JP)

(73) Assignee: Komatsu Ltd., Tokyo (JP)

( * ) Notice: Subject to any disclaimer, the term of this patent is extended or adjusted under 35 U.S.C. 154(b) by 80 days.

(21) Appl. No.: 14/443,456

(22) PCT Filed: Oct. 30, 2014

(86) PCT No.: PCT/JP2014/078965
§ 371 (c)(1),
(2) Date: May 18, 2015

(87) PCT Pub. No.: WO2015/050279
PCT Pub. Date: Apr. 9, 2015

(65) Prior Publication Data
US 2016/0300405 A1 Oct. 13, 2016

(51) Int. Cl.
G01M 17/00 (2006.01)
G06F 7/00 (2006.01)
G06F 19/00 (2011.01)
G07C 5/02 (2006.01)
G06Q 10/06 (2012.01)
E21F 13/00 (2006.01)
(Continued)

(52) U.S. Cl.
CPC ................ *G07C 5/02* (2013.01); *E21F 13/00* (2013.01); *G06Q 10/06* (2013.01); *G07C 5/085* (2013.01); *G07C 5/0808* (2013.01); *G01L 5/00* (2013.01)

(58) Field of Classification Search
CPC ........ G06Q 50/02; G06Q 10/06; E21C 47/00; G01C 21/10; G01L 5/00; G07C 5/02; E21F 13/00
USPC ......................... 701/32.1, 32.3, 50
See application file for complete search history.

(56) References Cited

U.S. PATENT DOCUMENTS

2005/0150283 A1* 7/2005 Shick ...................... B60C 11/24
73/146
2008/0213075 A1* 9/2008 Sjogren .................. B66F 9/065
414/700
2014/0244098 A1* 8/2014 Ueda ...................... G06Q 50/02
701/29.3

FOREIGN PATENT DOCUMENTS

JP 2008-014681 A 1/2008
JP 2008065753 A * 3/2008
(Continued)

OTHER PUBLICATIONS

International Search Report mailed Dec. 2, 2014, issued for PCT/JP2014/078965.

*Primary Examiner* — Isaac Smith
(74) *Attorney, Agent, or Firm* — Locke Lord LLP

(57) ABSTRACT

A system for managing a mining machine is included in a mining machine that travels in a mine. The system includes: a positional information detecting unit configured to acquire positional information indicating a position of the mining machine; and a traveling path calculating unit configured to obtain, from each of a plurality of the mining machines, positional information about an actual traveling path on (Continued)

which each of the mining machines actually has traveled, and generate a reference traveling path in the mine with the obtained positional information.

15 Claims, 8 Drawing Sheets

(51) Int. Cl.
  *G07C 5/08* (2006.01)
  *G01L 5/00* (2006.01)

(56) References Cited

FOREIGN PATENT DOCUMENTS

| | | | |
|---|---|---|---|
| JP | 2012-098251 A | 5/2012 | |
| JP | 2013-105278 A | 5/2013 | |

* cited by examiner

SYSTEM FOR MANAGING MINING MACHINE AND METHOD FOR MANAGING MINING MACHINE

FIELD

The present invention relates to a system and method for managing a mining machine.

BACKGROUND

Various construction machines such as an excavator and a dump truck operate on earthmoving sites or mining sites. Obtaining the information about the operation of construction machines with wireless communications is spreading in order to grasp the conditions of the construction machines. For example, Patent Literature 1 discloses a mining machine managing system that determines the path on which a dump truck has traveled based on the positional information included in the information about the operation of the dump truck.

CITATION LIST

Patent Literature

Patent Literature 1: Japanese Laid-open Patent Publication No. 2013-105278

SUMMARY

Technical Problem

By the way, assessing the path design or providing operational guidance to operators for improving the productivity in a mine requires a traveling path on which the mining machine has traveled. Some mines include traveling paths previously designed, and others do not include such traveling paths. The traveling path for the mining machine often varies depending on the progress on digging the mineral ore in a mine.

An objective of the present invention is to determine the traveling path on which a mining machine has traveled in a mine.

Solution to Problem

The present invention provides a system for managing a mining machine, the system comprising: a positional information detecting unit included in a mining machine that travels in a mine, and configured to acquire positional information indicating a position of the mining machine; and a traveling path calculating unit configured to obtain, from each of a plurality of the mining machines, positional information about an actual traveling path on which each of the mining machines has actually traveled, and to generate a reference traveling path in the mine with the obtained positional information.

The present invention provides a system for managing a mining machine, the system comprising: a positional information detecting unit included in a mining machine that travels in a mine, and configured to acquire positional information indicating a position of the mining machine; and a reference traveling path storing unit configured to store information about a reference traveling path in the mine, the information being generated with positional information that is about actual traveling paths on which a plurality of the mining machines have actually traveled and that is detected with the positional information detecting unit.

In the present invention, it is preferable that when the traveling path calculating unit newly obtains the positional information about the actual traveling path, the traveling path calculating unit regenerates the reference traveling path with the positional information including also the newly obtained positional information about the actual traveling path.

In the present invention, it is preferable that the system further comprises: an estimating unit configured to estimate damage to a wheel included in the mining machine from the positional information about the reference traveling path, an actual traveling speed at which the mining machine has traveled, and a load acting on the wheel.

In the present invention, it is preferable that the damage is expressed by an expression (1), $$DM = k \times LD \times V^2 / R \qquad (1),\text{ and}$$

the DM indicates the damage, the k indicates a constant of proportion, the LD indicates the load acting on the wheel, the V indicates the actual traveling speed, and the R indicates a curvature radius of a curve in the reference traveling path.

In the present invention, it is preferable that the estimating unit estimates the damage in a whole path on which the mining machine leaves a first position and moves to a second position at which materials are loaded on the mining machine, or in a whole path on which the mining machine leaves the second position and moves to a third position at which the mining machine dumps the materials.

In the present invention, it is preferable that the estimating unit estimates the damage in a whole path on which the mining machine leaves a first position and moves to a third position at which the mining machine dumps materials through a second position at which the materials are loaded on the mining machine.

In the present invention, it is preferable that the system further comprises: a report generating unit configured to generate a report about the estimated damage to the wheel.

The present invention provides a system for managing a mining machine, the system comprising: a positional information detecting unit included in a mining machine that travels in a mine, and configured to acquire positional information indicating a position of the mining machine; a traveling path calculating unit configured to obtain, from each of a plurality of the mining machines, positional information about an actual traveling path on which each of the mining machines has traveled, and generate a reference traveling path in the mine with the obtained positional information; an estimating unit configured to estimate damage to a wheel included in the mining machine that is expressed by an expression (2) from the positional information about the reference traveling path, an actual traveling speed at which the mining machine has traveled on the actual traveling path, and a load acting on the wheel; and a report generating unit configured to generate a report about the damage to the wheel estimated with the estimating unit for each operator of the mining machine, wherein $$DM = k \times LD \times V^2 / R \qquad (2),\text{ and}$$

the DM indicates the damage, the k indicates a constant of proportion, the LD indicates the load acting on the wheel, the V indicates the actual traveling speed, and the R indicates a curvature radius of a curve in the reference traveling path.

The present invention provides a method for managing a mining machine, the method comprising: acquiring, with a unit included in a mining machine that travels in a mine, positional information indicating a position of the mining machine; and obtaining, from each of a plurality of the mining machines, positional information about an actual traveling path on which each of the mining machines has traveled, and generating a reference traveling path in the mine with the obtained positional information.

In the present invention, it is preferable that The method for managing a mining machine further comprises: regenerating, when the positional information about the actual traveling path is newly obtained, the reference traveling path with the positional information including also the newly obtained positional information about the actual traveling path.

In the present invention, it is preferable that the method for managing a mining machine, further comprises: estimating damage to a wheel included in the mining machine from the positional information about the reference traveling path, an actual traveling speed at which the mining machine has traveled on the actual traveling path, and a load acting on the wheel.

In the present invention, it is preferable that the method for managing a mining machine, further comprises: generating a report about the estimated damage to the wheel.

Advantageous Effects of Invention

The present invention can determine the traveling path on which a mining machine has traveled in a mine.

DESCRIPTION OF EMBODIMENTS

The mode for implementing the present invention (embodiment) will be described in detail with reference to the appended drawings.

Figure 1:
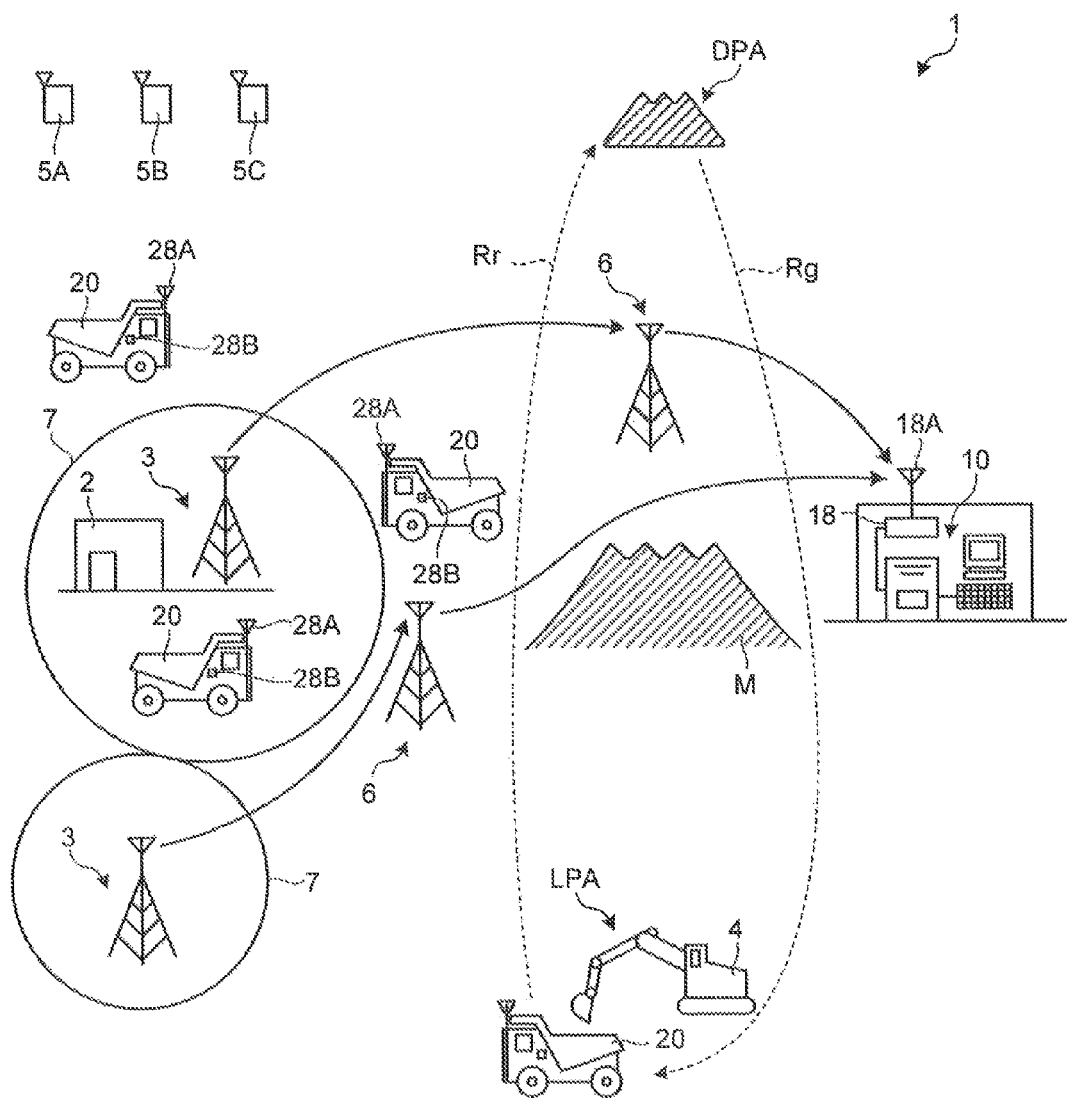
FIG. 1 is a diagram of the site on which a mining machine management system according to the present embodiment is used.

FIG. 1 is a diagram of the site on which a mining machine management system 1 according to the present embodiment is used. The mining machine management system 1, for example, manages the operation of the mining machine, assesses, for example, the productivity or the operational skill of the operator of the mining machine, or performs the preventive maintenance and malfunction diagnosis of dump trucks 20. To perform the above, the mining machine management system 1 determines paths on which the dump trucks 20 have traveled and accumulates the paths as path information. Hereinafter, the traveling path includes a path on which the dump truck 20 travels and a place at which the dump truck 20 stops. Hereinafter, the traveling path is properly referred to also as a path.

The mining machine is a generic name for machinery used for various works in a mine. The dump truck 20 transports a crushed stone, or the crushed rock and sand or stones that are generated while the crushed stone is mined as the loaded materials. The dump truck 20 exemplifies a transport vehicle working as a mining machine in the present embodiment. However, the mining machine according to the present embodiment is not limited to the dump truck 20. For example, the mining machine according to the present embodiment can also be an excavator, electric shovel, or wheel loader that functions as an excavating machine for mining the crushed stone and the like. The dump truck 20 in the present embodiment is a manned mining machine configured to travel or dump the loaded materials by the operator's control. However, the dump truck 20 is not limited to such a manned mining machine in the present embodiment. For example, the dump truck 20 can also be an unmanned dump truck of which operation is managed with the mining machine management system 1.

In a mine, the stones or the crushed rock and sand and the like are loaded on the dump truck 20 with a loading machine 4 such as an excavator at a place for loading materials (hereinafter, properly referred to as a loading place) LPA. Subsequently, the dump truck 20 dumps the loaded stones or crushed rock and sand and the like at a place for dumping the loaded materials (hereinafter, properly referred to as a dumping place) DPA. The dump truck 20 travels and moves on paths Rg and Rr between the loading place LPA and the dumping place DPA.

<Overview of Mining Machine Management System>

In the mining machine management system (hereinafter, properly referred to as a management system) 1, a management apparatus 10 collects operation information including information about the position of the dump truck 20 working as a mining machine from the dump truck 20 via wireless communications. Differently from the dump truck 20 that is a moving body, the management apparatus 10 is installed, for example, on a management facility for the mine. As described above, the motion of the management apparatus 10 is not considered in principle. The information that the management apparatus 10 collects is the information about the operating conditions of the dump truck 20 (hereinafter, properly referred to as operation information) including at least one, for example, of the positional information that is the information about the position of the dump truck 20, the travel time, the travel distance, the water temperature in the engine, the presence or absence of a fault, the faulty point, the fuel consumption rate, and the loading weight. The positional information about the dump truck 20 includes the coordinates of longitude, latitude, and altitude of the dump truck 20. The operation information is mainly used, for example, for creating a traveling path map for the dump truck 20, mapping the traveling path, assessing the operation, or the preventive maintenance and malfunction diagnosis. The operation information is useful to meet the needs to enhance the productivity in the mine or improve the operations in the mine.

The management apparatus 10 is connected to a management-side wireless communication device 18 including an antenna 18A in order to collect the operation information about the dump truck 20 that operates in the mine. The dump truck 20 includes a vehicle-mounted wireless communication device and an antenna 28A to transmit the operation information or mutually communicate with the management apparatus 10. The vehicle-mounted wireless communication device will be described below. Additionally, the dump truck 20 can determine its own position by receiving the radio waves from Global Navigation Satellite System (GNSS) satellites 5A, 5B, and 5C with an antenna 28B for GNSS. To determine its own position, the dump truck 20 can use not only the GNSS satellites but also another positioning satellite, for example, a Real Time Kinematic-Global Navigation Satellite System (RTK-GNSS) satellite.

The output of the radio waves that the dump truck 20 transmits from the antenna 28A does not include a communicable range that is wide enough to cover the entire area of the mine. The radio waves from the antenna 28A fail to be transmitted far beyond an obstacle such as a high mountain because of their wavelengths. Needless to say, using a wireless communication device that can highly output the radio waves can resolve such a communication failure. This can expand the communicable range and eliminate the area in which the dump truck 20 fails to perform communication. However, reducing the cost of the repeaters or communication devices is required for a large mine. Additionally, it is sometimes necessary to address a mine area in which a prepared communications infrastructure is not likely to be secured. In light of the foregoing, the management system 1 uses a wireless system such as a Local Area Network (LAN) that can establish an information network in a limited range. Such networks including a wireless LAN can build the mutual communication between a mining machine and a management facility (management apparatus 10) at a low cost. However, it is still necessary to resolve the communication failure.

The range in which the radio waves that the dump truck 20 transmits from the antenna 28A reach is limited. Any long distance or obstacle such as a mountain M between the dump truck 20 and the management apparatus 10 makes it difficult for the management-side wireless communication device 18 to receive the radio waves transmitted from the dump truck 20. In light of the foregoing, the management system 1 includes a repeater 3 configured to relay the radio waves transmitted from the antenna 28A on the dump truck 20 so as to transmit the radio waves to the management-side wireless communication device 18. Installing the repeaters 3 on a plurality of predetermined places in the mine enables the management apparatus 10 to collect the operation information from the dump truck 20 that operates at a position away from the management apparatus 10 via wireless communication. Note that the communication system that the management system 1 uses in the present embodiment is not limited to the wireless LAN. Alternatively, another communication system can be used.

If the repeater 3 is far away from the management-side wireless communication device 18, an intermediate repeater 6 configured to relay the radio waves between the repeater 3 and the management-side wireless communication device 18 is placed therebetween. The intermediate repeater 6 in the present embodiment relays the radio waves only between the repeater 3 and the management-side wireless communication device 18. The intermediate repeater 6 does not relay the radio waves that the dump truck 20 transmits from the antenna 28A. The intermediate repeater 6 in the present embodiment is not configured to relay the radio waves from repeaters other than the corresponding repeater 3. For example, only one intermediate repeater 6 relays the radio waves from the repeater 3 at a fueling station 2 as illustrated in FIG. 1. Note that the relationship between an intermediate repeater 6 and a repeater 3 is not limited to the relationship on a one-to-one basis although FIG. 1 illustrates that the intermediate repeater 6 and the repeater 3 are in a one-to-one relationship. Alternatively, each intermediate repeater 6 can relay the radio waves transmitted from a plurality of corresponding repeaters 3.

The predetermined region around the repeater 3, namely, the region surrounded a circle in FIG. 1 is a range in which the first wireless communication device included in the dump truck 20 can mutually communicate with the repeater 3 by radio, namely, a communicable range 7. The dump truck 20 in the communicable range 7 can mutually communicate with the management-side wireless communication device 18 by radio, for example, via the repeater 3. The first wireless communication device described above is a vehicle-mounted wireless communication device 27 illustrated in FIG. 3.

Next, the management apparatus 10 will be described in more detail.

<Management Apparatus>

Figure 2:
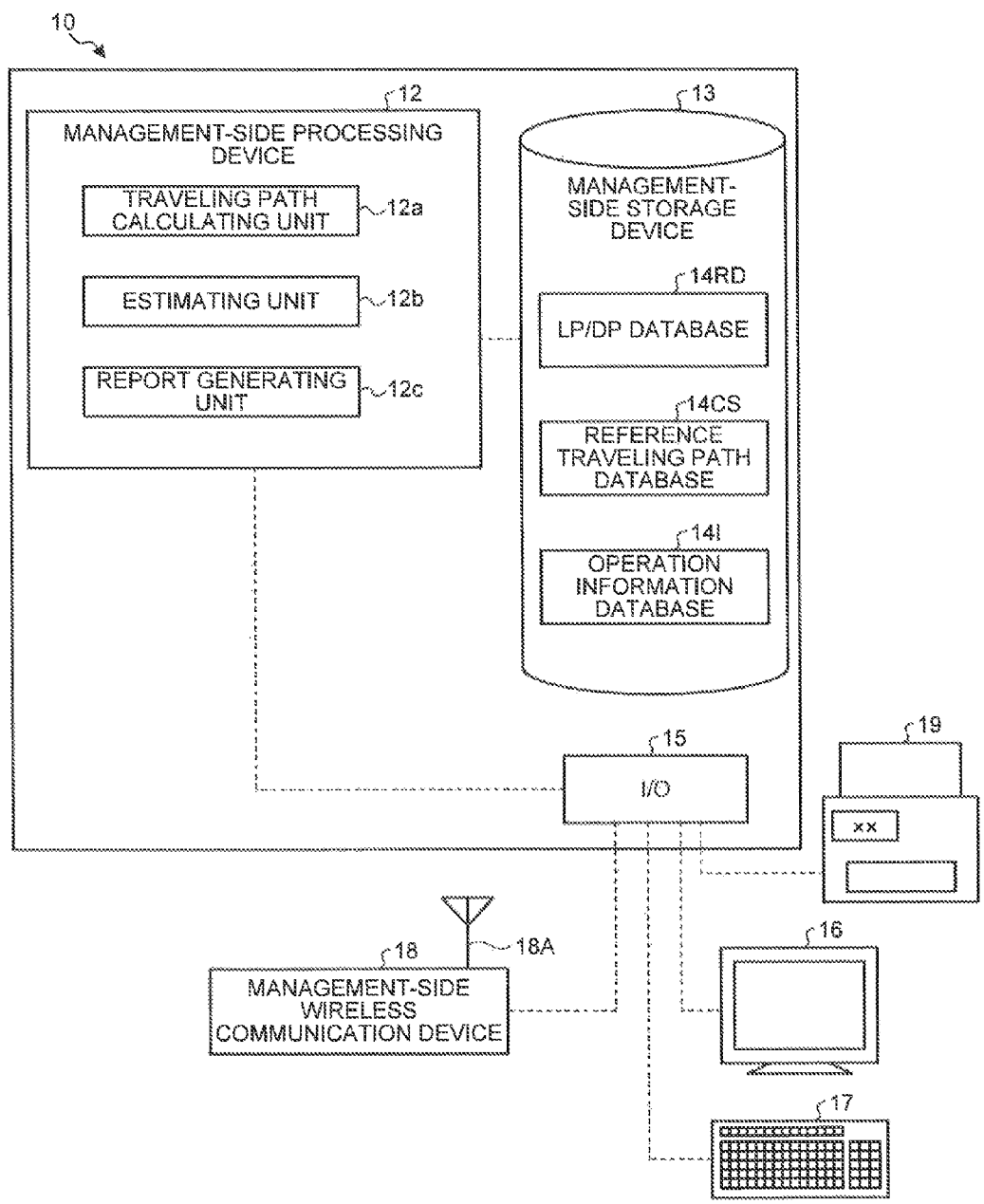
FIG. 2 is a functional block diagram of a management apparatus included in the mining machine management system according to the present embodiment.

FIG. 2 is a functional block diagram of the management apparatus 10 included in the mining machine management system 1 according to the present embodiment. The management apparatus 10 includes a management-side processing device 12, a management-side storage device 13, and an input and output (I/O) unit 15. Additionally, the input and output unit 15 in the management apparatus 10 is connected to a display device 16, an input device 17, the management-side wireless communication device 18, and an output device 19. The management apparatus 10 is, for example, a computer. The management-side processing device 12 is, for example, a Central Processing Unit (CPU). The management-side storage device 13 is, for example, a Random Access Memory (RAM), a Read Only Memory (ROM), a flash memory, a hard disk drive, or the combination thereof. The input and output unit 15 is used to input and output the information between the management-side processing device 12 and the display device 16, the input device 17, the management-side wireless communication device 18, and the output device 19 that are externally connected to the management-side processing device 12. In other words, the input and output unit 15 is used as an interface.

The management-side processing device 12 implements a method for managing the mining machine according to the present embodiment. The management-side processing device 12 includes a traveling path calculating unit 12a, an estimating unit 12b, and a report generating unit 12c. The traveling path calculating unit 12a obtains the positional information about the actual traveling paths on which a plurality of dump trucks 20 has actually traveled from the dump trucks 20 and generates a reference traveling path in the mine with the obtained positional information. When newly obtaining the positional information about the actual traveling path that the dump truck 20 has traveled, the traveling path calculating unit 12a regenerates the reference traveling path with the information including also the newly-obtained positional information about the actual traveling path. As described above, the increase in the number of the actual traveling paths of the dump trucks 20 in the positional information improves the accuracy of the reference traveling path.

The estimating unit 12b estimates the damage to the tires according to the positional information about the reference traveling path, the actual traveling speed at which the dump truck 20 has traveled, and the load on the wheels, more specifically, the tires included in the dump truck 20. The report generating unit 12c generates a report about the damage to the wheels included in the dump truck 20 that the estimating unit 12b has estimated. The report generating unit 12c displays the generated report on the display device 16, or outputs the report from the output device 19.

The management-side storage device 13 stores various computer programs for causing the management-side processing device 12 to perform various processes. The management-side storage device 13 in the present embodiment stores, for example, a computer program for generating the reference traveling path according to the positional information about the actual traveling path on which the dump truck 20 has actually traveled by implementing the mining machine managing method according to the present embodiment, a computer program for collecting the information including the operation information about the dump truck 20, and a computer program for performing various analyses based on the information including the operation information.

The management-side storage device 13 stores, for example, an LP/DP database 14RD, a reference traveling path database 14CS, and an operation information database 14I. The LP/DP database 14RD holds the positional information about the loading place LPA and the positional information about the dumping place DPA. The reference traveling path database 14CS holds information about the reference traveling path generated with the traveling path calculating unit 12a. In other words, the management-side storage device 13 is a reference traveling path storing unit that stores the information about the reference traveling path in the mine. The operation information database 14I holds the operation information collected from the dump trucks 20.

The display device 16 is, for example, a liquid crystal display. The input device 17 is, for example, a keyboard, a touch panel, or a mouse. The management-side wireless communication device 18 includes the antenna 18A to mutually communicate with the vehicle-mounted wireless communication device on the dump truck 20 described below by radio via the repeater 3. The output device 19 is, for example, a printing apparatus (printer). The output device 19 prints and outputs, for example, the report generated with the report generating unit 12c in the management apparatus 10. The output device 19 can further output the sound corresponding to the content of the report described below. Next, the dump truck 20 will be described in more detail.

<Dump Truck>

Figure 3:
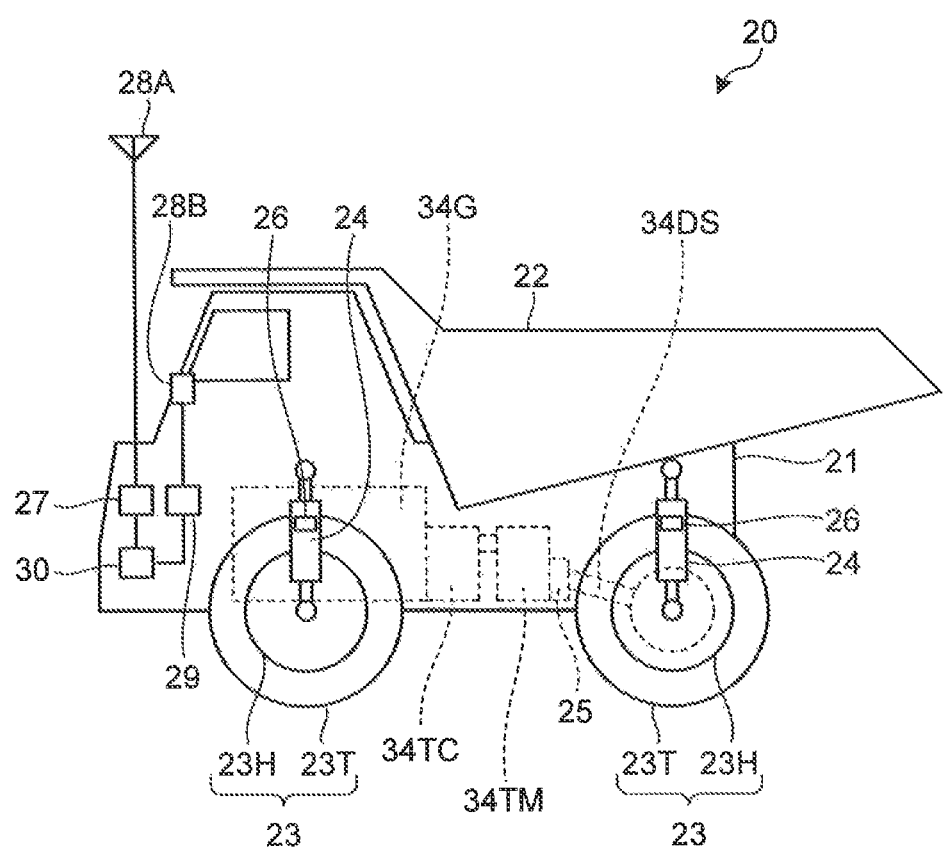
FIG. 3 is a diagram of the configuration of a dump truck.

FIG. 3 is a diagram of the configuration of the dump truck 20. The dump truck 20 travels with the materials loaded thereon and dumps the loaded materials at a desired place. The dump truck 20 includes a vehicle body 21, a vessel 22, wheels 23, suspension cylinders 24, a rotation sensor 25, and a suspension pressure sensor (hereinafter, properly referred to as a pressure sensor) 26, the vehicle-mounted wireless communication device 27 to which the antenna 28A is connected, a positional information detecting apparatus (GNSS antenna 28B receiver in the present embodiment) 29 to which the GNSS antenna 28B is connected, and a vehicle-mounted information collecting device 30. In addition to the configuration described above, the dump truck 20 also includes various mechanisms and functions that a common transporting machine may include. A rigid dump truck exemplifies the dump truck 20 in the present embodiment. However, the dump truck 20 can also be an articulated dump truck of which vehicle body is divided into front and rear portions that are connected to each other with a free joint.

An internal combustion engine such as a diesel engine (hereinafter, properly referred to as an engine 34G) drives a drive shaft 34DS through a torque converter 34TC and a transmission 34TM in the dump truck 20. This drives the wheels 23. As described above, the dump truck 20 is a mechanical drive dump track. However, the driving method for the dump truck 20 is not limited to the mechanical drive. Alternatively, the method can also be electrical drive. The vessel 22 that functions as a container to load the materials is placed on the upper portion of the vehicle body 21 such that the vessel 22 freely moves up and down. The mined and crushed stones, or rocks and soils are loaded on the vessel 22 as the materials with the loading machine 4 such as an excavator.

The wheels 23 include tires 23T and wheel rims 23H on which the tire 23T are fitted. The wheels 23 are rotatably held to the vehicle body 21 and driven by the power transmitted from the vehicle body 21 as described above. The suspension cylinder 24 is placed between each of the wheels 23 and the vehicle body 21. The load corresponding to the mass of the vehicle body 21, the vessel 22, and the materials (only when the materials are loaded) acts on each of the wheels 23 through the suspension cylinder 24.

The rotation sensor 25 measures the traveling speed of the dump truck 20, namely, the vehicle speed by detecting the revolution speed of the drive shaft 34DS that drives the wheels 23. As described above, the rotation sensor 25 includes a function as a vehicle speed sensor. The suspension cylinder 24 includes the operating oil enclosed therein so as to expand and contract depending on the weight of the loaded materials. The pressure sensor 26 detects the load acting on the suspension cylinder 24. The pressure sensor 26 is installed on each suspension cylinder 24 in the dump truck 20. The pressure sensor 26 can measure the mass of the loaded materials (the loading weight) by detecting the pressure on the operating oil. The pressure sensor 26 can also measure the load acting on each of the wheels 23 included in the dump truck 20.

The GNSS antenna 28B receives the radio waves output from the GPS satellites 5A, 5B, and 5C included in the GNSS (see FIG. 1). The GNSS antenna 28B outputs the received radio waves to the positional information detecting apparatus 29. The positional information detecting apparatus 29 working as the positional information detecting unit finds the positional information about the dump truck 20 by converting the radio waves received with the GNSS antenna 28B into electric signals and calculating (measuring) its own positional information, namely, the position of the dump truck 20. The positional information is about the position of the dump truck 20, and the coordinates of longitude, latitude, and altitude. A plurality of pieces of the positional information that the positional information detecting apparatus 29 has obtained based on the passage of time and that are arranged in chronological order form an actual traveling path that the dump truck 20 has traveled.

The positional information detecting apparatus 29 calculates the positional information about the dump truck 20 in the present embodiment. However, the calculation is not limited to the present embodiment. Alternatively, the positional information about the dump truck 20 can be calculated, for example, based on the information obtained from various sensors including a sensor for detecting the traveling speed of the dump truck 20, an acceleration sensor for detecting the acceleration acting on the dump truck 20, and a posture detecting sensor for detecting the posture of the dump truck 20.

The vehicle-mounted wireless communication device 27 mutually communicates with the repeater 3 or the antenna 18A in the management facility in FIG. 1 by radio via the antenna 28A. The vehicle-mounted wireless communication device 27 is connected to the vehicle-mounted information collecting device 30. The configuration as described above causes the vehicle-mounted information collecting device 30 to transmit and receive each piece of information via the antenna 28A. Next, the vehicle-mounted information collecting device 30 and its peripheral devices will be described.

<Vehicle-Mounted Information Collecting Device and Peripheral Devices>

Figure 4:
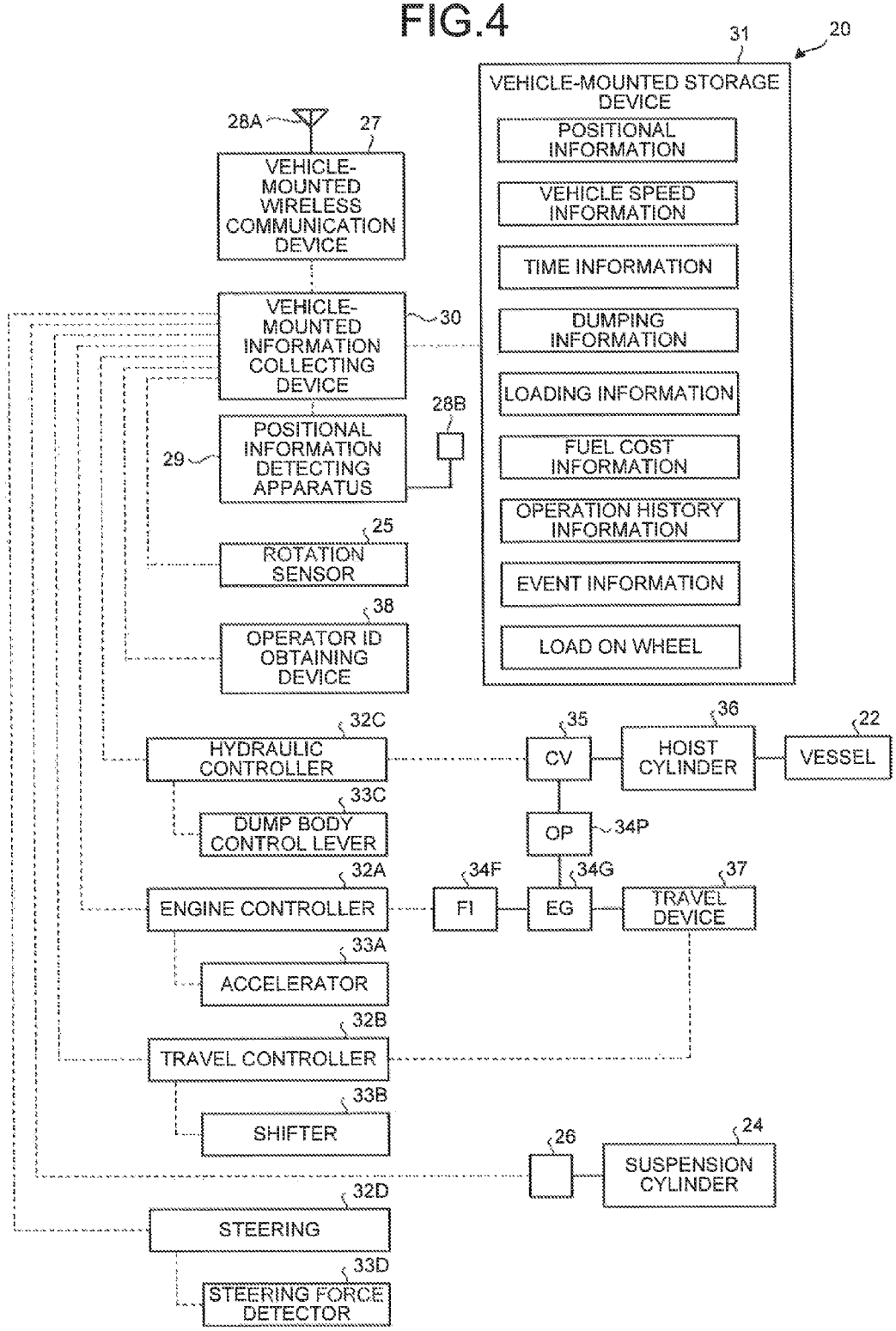
FIG. 4 is a functional block diagram of a vehicle-mounted information collecting device and its peripheral devices.

FIG. 4 is a functional block diagram of the vehicle-mounted information collecting device 30 and its peripheral devices. The vehicle-mounted information collecting device 30 included in the dump truck 20 is connected to a vehicle-mounted storage device 31, the vehicle-mounted wireless communication device 27, and the positional information detecting apparatus 29. The vehicle-mounted information collecting device 30 is also connected to a condition obtaining device. The vehicle-mounted information collecting device 30 is a computer that is the combination, for example, of a Central Processing Unit (CPU) and a memory.

The vehicle-mounted information collecting device 30 is configured to obtain and collect the information about various operating conditions of the dump truck 20 working as a mining machine. For example, the condition obtaining device includes the pressure sensor 26 installed on the suspension cylinder 24, the other various sensors, an engine controller 32A, a travel controller 32B, a hydraulic controller 32C, a steering 32D, an operator ID obtaining device 38 and the rotation sensor 25. The vehicle-mounted information collecting device 30 obtains the information about various operating conditions of the dump truck 20 from the condition obtaining device described above, and then collects the obtained information as the operation information.

For example, the vehicle-mounted information collecting device 30 can obtain the information indicating the fuel consumption amount by obtaining the fuel amount controlled with a fuel injector (FI) 34F from the engine controller 32A. The vehicle-mounted information collecting device 30 can obtain the information about the fuel cost according to the information indicating the fuel consumption amount. The vehicle-mounted information collecting device 30 can further obtain the amount of the control of an accelerator 33A through the engine controller 32A. The information indicating the amount of the control of the accelerator 33A by the operator of the dump truck 20 enables the grasp of the state of the operation by the operator of the dump truck 20. The vehicle-mounted information collecting device 30 can obtain various types of information including the revolution speed of the engine (EG) 34G, the temperature of the cooling water, and the pressure on the lubricant oil from the engine controller 32A. The information about the revolution speed of the engine (EG) 34G is obtained from the revolution speed detected, for example, with the rotation sensor (not illustrated) attached to the output shaft of the engine (EG) 34G. The various types of information such as the temperature of the cooling water, and the pressure on the lubricant oil can also be obtained from a temperature sensor and pressure sensor (not illustrated).

The vehicle-mounted information collecting device 30 can obtain various types of information about a travel device 37 from the travel controller 32B. The dump truck 20 in the present embodiment is a mechanical drive dump truck. Thus, the travel device 37 includes the torque converter 34TC and the transmission 34TM driven with the engine 34G, and the drive shaft 34DS that transmits the driving force from the transmission 34TM to the wheels 23 illustrated in FIG. 3. The various types of information about the travel device 37 include, for example, the state of the switch among the speed stages of the transmission 34TM, the revolution speed of the output shaft, and the revolution speed of the drive shaft 34DS. The vehicle-mounted information collecting device 30 can obtain the state of the control by the operator of the dump truck 20 by obtaining the shifted position or the amount of control of a shifter 33B through the travel controller 32B. The shifter 33B is used such that the operator gives the travel controller 32B an instruction to move the dump truck 20 forward or backward, or change the traveling speed stage.

The vehicle-mounted information collecting device 30 can further obtain the state of the switch of an operating oil control valve (CV) 35 from the hydraulic controller 32C. In this example, the operating oil control valve 35 supplies the operating oil discharged from an oil pump (OP) 34P driven by the operation of the engine 34G to a hoist cylinder 36 (hydraulic cylinder) that moves the vessel 22 up and down, or discharges the operating oil from the hoist cylinder 36. This enables the vehicle-mounted information collecting device 30 to keep track of the up and down motion of the vessel 22 based on the switch of the operating oil control valve 35. The vessel 22 moves up and down by the operation of a dump body control lever 33C by the operator. This also enables the vehicle-mounted information collecting device 30 to keep track of the up and down motion of the vessel 22 by obtaining the amount of control or shifted position of the dump body control lever 33C through the hydraulic controller 32C.

The vehicle-mounted information collecting device 30 can keep track of the weight of the materials loaded on the vessel 22 by obtaining the pressure acting on the operating oil in the suspension cylinder 24 and detected with the pressure sensor 26. The vehicle-mounted information collecting device 30 can calculate the mass of the loaded materials (the loading weight) based on the measured value indicated with the pressure sensor 26 included in each of the suspension cylinders 24 attached to each of the wheels 23 of the dump truck 20 (for example, four pressure sensors 26 are included for four wheels 23). It can be determined whether the materials are loaded on the vessel 22 of the dump truck 20, are currently dumped, or has been dumped from the vessel 22 by monitoring the variations in the pressure detected with the pressure sensor 26 and acting on the operating oil in the suspension cylinder 24 with the passage of time.

For example, when the pressure detected with the pressure sensor 26 increases and exceeds a predetermined value (for example, a value equivalent to half of the prescribed loading weight of the dump truck 20), it can be determined that the materials have been loaded at the loading place LPA. On the other hand, when the pressure detected with the pressure sensor 26 decreases and is lower than a predetermined value (for example, a value equivalent to one-quarter of the prescribed loading weight of the dump truck 20), it can be determined that the materials are currently dumped (or have been dumped) at the dumping place DPA. Determining whether the materials have been loaded or dumped with, for example, the state of the control (shifted position or amount of the control) of the dump body control lever 33C or the positional information about the dump truck 20 in addition to the pressure detected with the pressure sensor 26 can improve the accuracy of the determination whether the materials have been loaded on the vessel 22. Note that the dumping operation can be determined only based on the state of the control of the dump body control lever 33C.

The vehicle-mounted information collecting device 30 can keep track of the load acting on each of the wheels 23 from the upper portion of the suspension cylinder 24 by obtaining the pressure that acts on the operating oil in the suspension cylinder 24 and that is detected with the pressure sensor 26. Dividing the mass of the structure between the suspension cylinder 24 and each of the wheels 23 to each of the wheels 23 can find the load that the structure gives to each of the wheels 23. The load acting on each of the wheels 23 is equal to the sum of the load that the structure gives to each of the wheels 23 and the load acting on each of the wheels 23 from the upper portion of the suspension cylinder 24. The vehicle-mounted information collecting device 30 finds the load acting on each of the wheels 23 and then stores the load as the operation information to the vehicle-mounted storage device 31.

The operator ID obtaining device 38 is configured to obtain an operator ID for identifying the operator of the dump truck 20. The dump truck 20 is sometimes driven by a plurality of operators in turn. The operator ID can be obtained, for example, from an ID key (electronic key storing the personal identification information) of the individual operator, or an ID card (card storing the personal identification information) of the individual operator. In that case, for example, a magnetic reader or a wireless communication device is used as the operator ID obtaining device 38. Alternatively, verifying the individual operator's fingerprint against the stored operator fingerprints with a fingerprint authentication apparatus included as the operator ID obtaining device 38 can also obtain the operator ID. Alternatively, the individual operator inputs his or her own ID information (personal identification information, for example, his or her personal identification number) to an input device such that the information is verified against the stored ID information. This can also obtain the operator ID. As described above, the operator ID obtaining device 38 is, for example, an ID key or ID card reader, a fingerprint authentication apparatus, or an ID information input device. The operator ID obtaining device 38 may be provided near the driver's seat in the driver's cabin of the dump truck 20, or an arbitrary place in the vehicle body 21 where the operator approaches when the operator accesses the driver's cabin. Note that the operator ID of the operator who drives each of the dump trucks 20 is sometimes transmitted from the management apparatus 10 to the dump truck 20 via wireless communication in compliance with the daily production schedule for the mine. In that case, the vehicle-mounted wireless communication device 27 is used also as the operator ID obtaining device 38. The operator ID that the operator ID obtaining device 38 has obtained can determine which operator drives the dump truck 20.

The rotation sensor 25 detects the traveling speed of the dump truck 20, namely, the vehicle speed. The vehicle-mounted storage device 31 includes, for example, a Random Access Memory (RAM), a Read Only Memory (ROM), a flash memory, a hard disk drive, or the combination thereof. The vehicle-mounted storage device 31 stores a computer program including an instruction for causing the vehicle-mounted information collecting device 30 to collect the operation information, and various parameters for operating the mining machine management system 1. The vehicle-mounted information collecting device 30 reads the computer program to obtain the operation information from each of the condition obtaining devices at a predetermined timing, and then stores the operation information in the vehicle-mounted storage device 31 temporarily. At that time, the vehicle-mounted information collecting device 30 can also perform a statistical process for finding, for example, the average value, mode value, or standard deviation of the information about an item.

The steering 32D is configured to move the steering wheel of the dump truck 20, generally, the front wheels 23. The force that the steering 32D generates to move the steering wheel, namely, the steering force is detected with a steering force detector 33D and transmitted to the vehicle-mounted information collecting device 30. Stationary steering, in other words, the fact that the steering wheel has been moved while the dump truck 20 has been stationary can be detected from the steering force. The stationary steering requires a steering force greater than that generated in the dump truck 20 that travels. Thus, detecting a steering force exceeding a predetermined threshold with the steering force detector 33D can determine that stationary steering has been done. The steering force detector 33D detects the amount of steering by detecting the hydraulic pressure acting on the steering cylinder that moves the front wheels 23.

The vehicle-mounted storage device 31 stores, for example, the positional information, the information on the vehicle speed, the information on the time, the information about the dumping of the materials, the information about the loading of the materials, the information on the fuel cost, the operation history information, the information about events, and the load on the wheel (the load acting on each of the wheels 23) as the operation information. The information on events includes the information on abnormal operation, the information on a vehicle error, and the information on a specific operation. The operation information stored in the vehicle-mounted storage device 31 is an example, however, the operation information is not limited to the example. The pieces of the positional information, the information on the vehicle speed, the information about the dumping of the materials, the information about the loading of the materials, the information on the fuel cost, the operation history information, and the information about events are linked to the times at which the pieces of information have been generated (at which the vehicle-mounted information collecting device 30 has obtained the pieces of information) and are stored in the vehicle-mounted storage device 31. The vehicle-mounted information collecting device 30 receives a command signal indicating a request from the management apparatus 10 illustrated in FIG. 2 through the vehicle-mounted wireless communication device 27, and transmits the operation information stored in the vehicle-mounted storage device 31 to the management apparatus 10 similarly through the vehicle-mounted wireless communication device 27.

Figure 5:
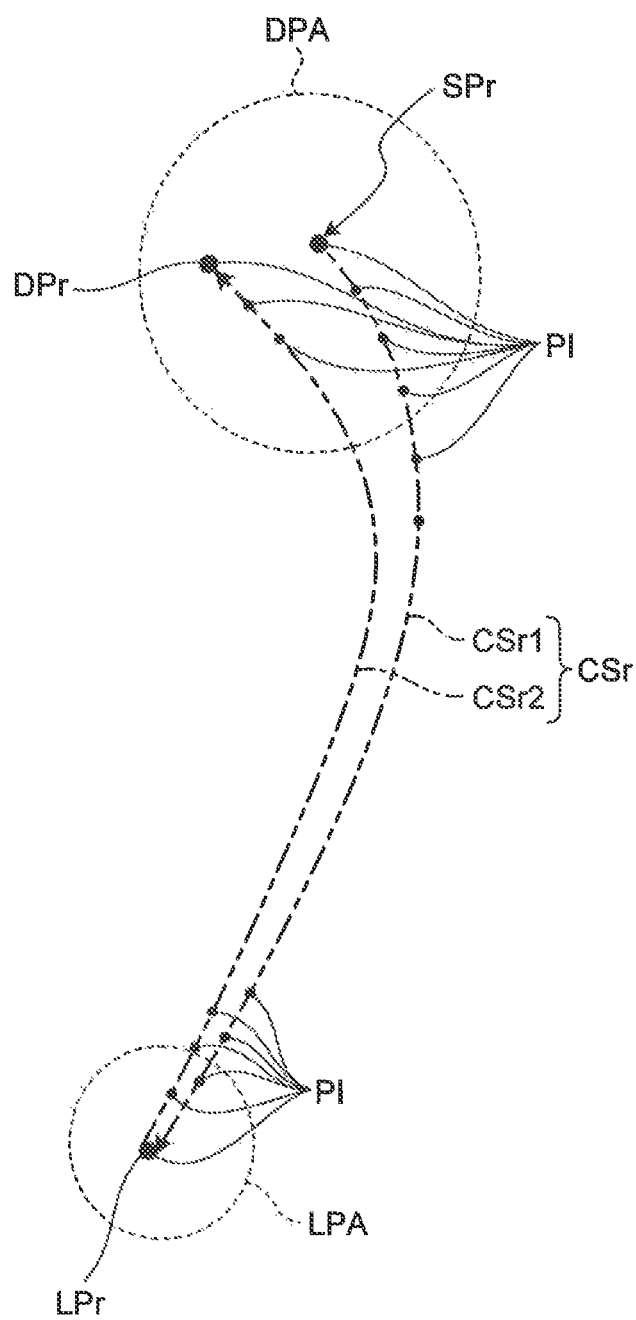
FIG. 5 is a diagram of an exemplary path on which the dump truck has traveled.

FIG. 5 is a diagram of an exemplary path that the dump truck 20 has traveled. The dump truck 20 travels toward the loading place LPA after dumping the materials at the dumping place DPA illustrated in FIG. 5. After the dump truck 20 arrives at the loading place LPA, a mining machine used to load the materials, such as an excavator, loads the materials to the vessel 22. The dump truck 20 on which the materials are loaded travels toward the dumping place DPA. After arriving at the dumping place DPA, the dump truck 20 dumps the materials at the dumping place DPA. A series of operations in which the dump truck 20 leaves a predetermined place for the loading place LPA, the materials are loaded with the materials on the dump truck at the loading place LPA, and then the dump truck 20 arrives and dumps the materials at the dumping place DPA as described above is a cycle of transporting operations with the dump truck 20. The predetermined place that the dump truck 20 leaves for the loading place LPA is referred to as a first position. The loading place LPA is referred to as a second position. The position at which the materials are dumped in the dumping place DPA is referred to as a third position. The first position in the present embodiment may be a predetermined position in the dumping place DPA or a predetermined position different from the dumping place DPA.

In a path on which the dump truck 20 has traveled in a transporting operation cycle (hereinafter, properly referred to as an actual traveling path) CSr, a path on which the dump truck 20 moves from a travel starting position SPr as the first position to a loading position LPr as the second position at which the materials are loaded in the loading place LPA is referred to as an outward path CSr1. In the actual traveling path CSr, a path on which the dump truck 20 moves from the loading position LPr as the second position to a dumping position DPr as the third position at which the materials are dumped in the dumping place DPA is referred to as a homeward path CSr2. The travel starting position SPr is the starting point and the loading position LPr is the ending point in the outward path CSr1. The loading position LPr is the starting point and the dumping position DPr is the ending point in the homeward path CSr2.

The positional information detecting apparatus 29 mounted on the dump truck 20 finds the positional information PI about the dump truck 20 while the dump truck 20 leaves the travel starting position SPr, arrives at the loading position LPr, and then reaches the dumping position DPr. The positional information PI indicates the position of the dump truck 20 obtained with the GNSS. For example, the positional information detecting apparatus 29 obtains the positional information about the present position of the dump truck 20 every predetermined time (for example, every second) and stores the information in the vehicle-mounted storage device 31. A group of a plurality of pieces of positional information PI obtained with the positional information detecting apparatus 29 (hereinafter, properly referred to as a positional information group) is included in the actual traveling path CSr of the dump truck 20. Thus, the actual traveling path CSr can be expressed with the pieces of positional information PI. The positional information detecting apparatus 29 stores the positional information in the vehicle-mounted storage device 31 in the present embodiment as an example. However, the present invention is not limited to the example. For example, the positional information detecting apparatus 29 can transmit the positional information to the management apparatus 10 in real time.

<Generation of Reference Traveling Path>

Figure 6:
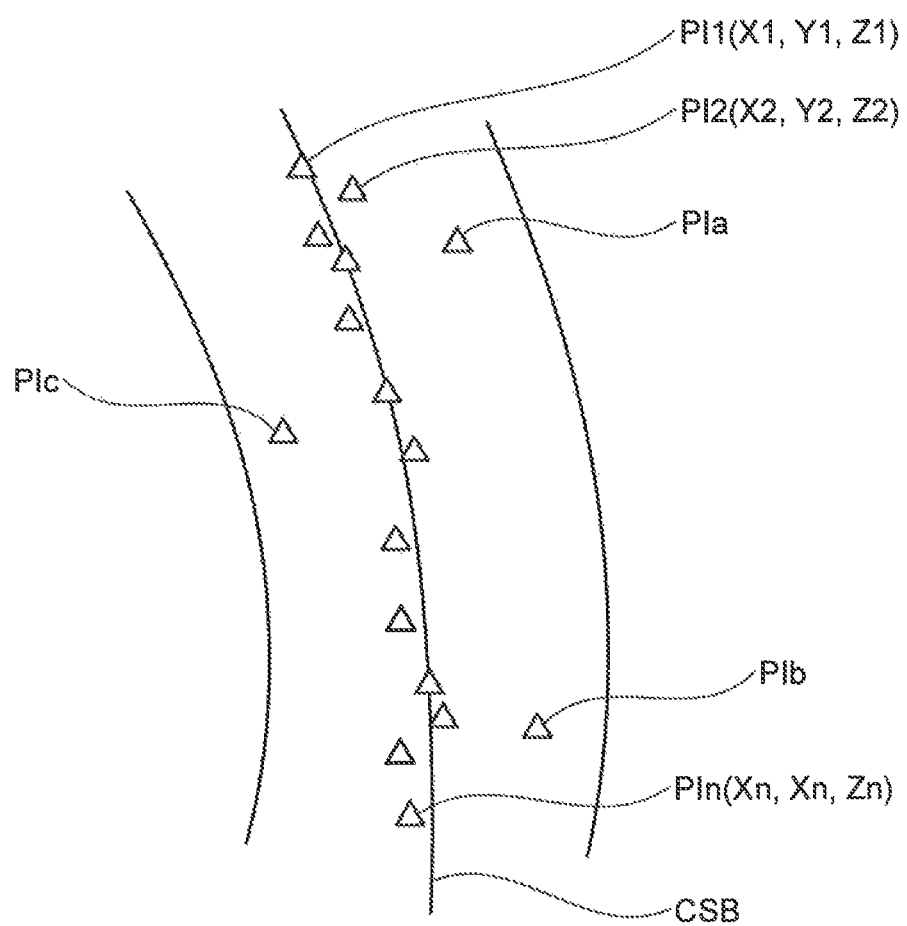
FIG. 6 is a diagram of a reference traveling path.

FIG. 6 is a diagram of a reference traveling path CSB. The travel motion of the dump truck 20 wears the wheels 23, more specifically, the tires 23T. The damage that the tires 23T receive by the travel motion (hereinafter, properly referred to as tire damage) has a high correlation with each of the vehicle speed of the dump truck 20, the load acting on the tires 23T, and the curvature radius of a curve in the actual traveling path CSr on which the dump truck 20 has traveled. Thus, to estimate the tire damage, the estimating unit 12b in the management apparatus 10 illustrated in FIG. 2 requires the information about the traveling path on which the dump truck 20 has traveled.

A traveling path on which the dump truck 20 is to travel is constructed according to the traveling path data based on the plan for some mines. However, no traveling path data based on the plan is provided to other mines. Additionally, the traveling path for the dump truck 20 is sometimes changed according to the progress of the mining of mineral ore. Thus, the positional information PI on the dump truck 20 does not necessarily provide the shape of the traveling path in a mine.

In the present embodiment, the traveling path calculating unit 12a in the management apparatus 10 illustrated in FIG. 2 obtains the positional information PI about the dump truck 20 obtained with the GNSS from the dump truck 20. Subsequently, the traveling path calculating unit 12a generates an approximate curve from the obtained pieces of positional information PI, for example, with a least square method. The approximate curve is the reference traveling path. In the example illustrated in FIG. 6, the traveling path calculating unit 12a finds the approximate curve showed with a solid line and calculated in the least square method using the pieces of positional information PI1 (X1, Y1, and Z1), PI2 (X2, Y2, and Z2), . . . PIn (Xn, Yn, and Zn) that are obtained with the GNSS. The approximate curve is a reference traveling path CSB. The calculated reference traveling path CSB is stored in the reference traveling path database 14CS of the management-side storage device 13 in the management apparatus 10 illustrated in FIG. 2. The reference traveling path CSB is the set of the coordinates of longitude, latitude, and altitude.

The variations in accuracy inherent in the GNSS may cause the traveling path calculating unit 12a to generate a reference traveling path CSB having a shape or curvature radius different from the obtained positional information PI when a different dump truck 20 or the same dump truck 20 travels on the same path. In that case, different shapes or curvatures may be found from the same corner. When the management apparatus 10 obtains the positional information PI that the dump truck 20 has obtained from the GNSS from the dump truck 20, the limited amount of communication with communication lines limits the amount of positional information PI that the management apparatus 10 can obtain.

Consequently, when generating a reference traveling path CSB, the management apparatus 10 does not receive all the transferred pieces of positional information PI about the dump truck 20 that the positional information detecting apparatus 29 on the dump truck 20 has detected with the GNSS, but obtains some of the transferred pieces of positional information PI. For example, the positional information detecting apparatus 29 of the dump truck 20 obtains the positional information PI from the GNSS every 0.1 second whereas the management apparatus 10 obtains the positional information PI from the dump truck 20, for example, every 10 seconds. This reduces the amount of positional information PI that the management apparatus obtains. Thus, the traveling path calculating unit 12a generates a reference traveling path CSB from the reduced amount of positional information PI. This may cause the reduction in accuracy.

In light of the foregoing, the traveling path calculating unit 12a of the management apparatus 10 obtains the positional information PI from a plurality of dump trucks 20 operating in the mine at a plurality of times to find the reference traveling path CSB from the obtained pieces of positional information PI. Consequently, the traveling path calculating unit 12a can find the reference traveling path CSB by approximating many pieces of positional information PI. This can prevent the reduction in accuracy of the reference traveling path CSB.

When the traveling path calculating unit 12a generates a reference traveling path CSB, the pieces of positional information PIa, PIb, and PIc are removed in the approximate calculation with a least square method. This is because each of the pieces has a deviation from the reference traveling path CSB larger than a predetermined threshold. The removal enables the traveling path calculating unit 12a to generate a reference traveling path CSB with an improved accuracy. The predetermined threshold may be, for example, 3 m.

As described above, the traveling path calculating unit 12a in the present embodiment collects low granularity positional information PI with the GNSS from the dump trucks 20 to create the shape of the reference traveling path CSB from a rough shape of the traveling path. At that time, to generate a more accurate reference traveling path CSB, the traveling path calculating unit 12a removes the pieces of positional information PIa, PIb, and PIc each having a large deviation as the information, for example, from the GNSS having bad reception.

The traveling path calculating unit 12a collects the positional information PI when a plurality of dump trucks 20 have traveled from the dump trucks to generate a reference traveling path CSB. This enables the traveling path calculating unit 12a to determine the traveling path on which a dump truck 20 is to travel as the reference traveling path CSB in the mine. When obtaining the positional information PI about a new traveling path from the same dump truck 20 or a different dump truck 20, the traveling path calculating unit 12a regenerates a reference traveling path CSB with the information including also the newly obtained positional information PI. This enables the traveling path calculating unit 12a to generate a reference traveling path CSB corresponding to the new positional information PI if the dump truck 20 changes the traveling path due to the change of the position of the loading place LPA or dumping place DPA illustrated in FIG. 5 or an obstacle on the traveling path of the dump truck 20. In light of the foregoing, the management system 1 is preferably used in a mine in which the traveling path of the dump truck 20 is often changed.

<Assessment of Tire Damage>

The estimating unit 12b in the management apparatus 10 illustrated in FIG. 2 estimates the tire damage from the positional information about the reference traveling path CSB, the actual traveling speed at which the dump truck 20 has traveled, and the load acting on the wheels 23, more specifically, the tires 23T included in the dump truck 20. The tire damage is expressed by an expression (1). The DM indicates the tire damage, the LD indicates the load acting on the wheels 23, more specifically, the tires 23T, the V indicates the actual traveling speed of the dump truck 20, and the R indicates the curvature radius of a curve in the reference traveling path CSB. If the k is the constant of proportion, the expression (1) is rewritten to an expression (2). The k is found, for example, through simulation or experiment.

$$DM \propto LD \times V^2 / R \quad (1)$$

$$DM = k \times LD \times V^2 / R \quad (2)$$

Figure 7:
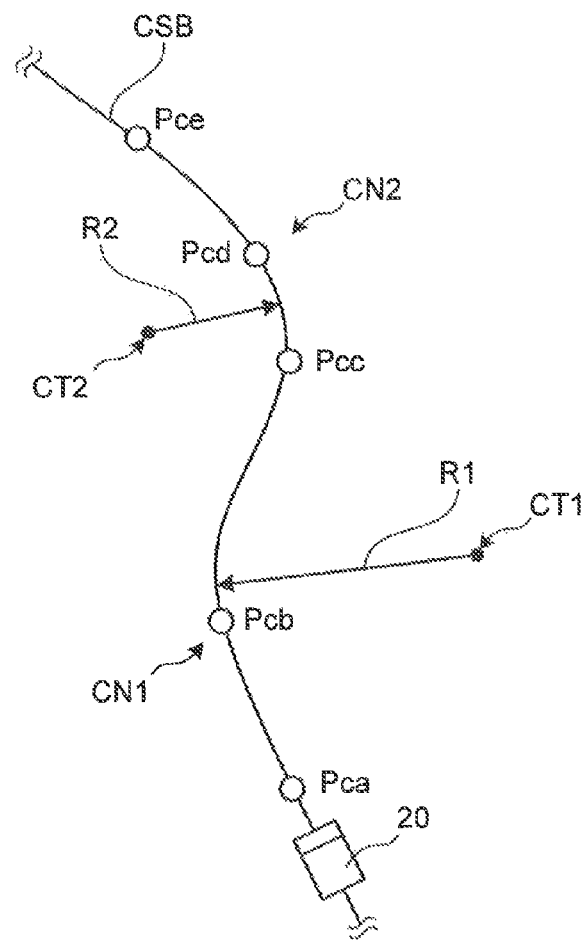
FIG. 7 is a diagram of an exemplary shape of the reference traveling path.

FIG. 7 is a diagram of an exemplary shape of the reference traveling path CSB. The reference traveling path CSB illustrated in FIG. 7 includes a corner CN1 having a curvature radius R1 around a position CT1, and a corner CN2 having a curvature radius R2 around a position CT2. The reference traveling path CSB further includes the information about the direction. When the dump truck 20 has traveled on the reference traveling path CSB illustrated in FIG. 7, the estimating unit 12b in the management apparatus 10 illustrated in FIG. 2 reads the reference traveling path CSB, more specifically, the coordinates of the pieces of positional information Pca, Pcb, Pcc, Pcd, and Pce included in the reference traveling path CSB in order to estimate the tire damage of the dump truck 20 from the reference traveling path database 14CS.

When the pieces of positional information Pca, Pcb, Pcc, Pcd, and Pce in the reference traveling path CSB are not distinguished from each other, they are collectively referred to as positional information Pc. The information about the reference traveling path CSB stored in the reference traveling path database 14CS includes the positional information Pc and the curvature radii R1 and R2 of the corners CN1 and CN2 in the reference traveling path CSB.

To estimate the tire damage of the dump truck 20, the estimating unit 12b reads the positional information PI, the information on the speed, the load LD on the tire 23T of the dump truck 20 of which tire damage is to be estimated and which has traveled on the reference traveling path CSB from the operation information database 14I. The information on the speed of the dump truck 20 is the actual traveling speed at which the dump truck 20 has traveled on the reference traveling path CSB.

The estimating unit 12b determines the position of the reference traveling path CSB on which the dump truck 20 has traveled from the positional information PI about the dump truck 20 and the positional information Pc about the reference traveling path CSB. It is determined from the position of the reference traveling path CSB on which the dump truck 20 has traveled whether the dump truck 20 has traveled on the corners CN1 and CN2, or traveled on a straight part of the reference traveling path CSB. When the dump truck 20 has traveled, for example, on the corner CN1, the estimating unit 12b finds the tire damage DM by substituting the curvature radius R1 of the corner CN1 in the reference traveling path CSB, the traveling speed V at which the dump truck 20 has traveled on the corner CN1, and the load LD on the tire 23T into the expression (1). The tire damage DM is found for each of the tires 23T included in the dump truck 20.

As shown in the expression (1), when the curvature radius R in the reference traveling path CSB has an infinite value, the tire damage DM is zero. The curvature radius R has an infinite value on the straight part in the reference traveling path CSB. Thus, the tire damage DM is zero on the straight part. The estimating unit 12b finds, along the whole reference traveling path CSB, the tire damage DM of the dump truck 20 that has traveled on the reference traveling path CSB and then adds the values for each of the tires 23T. The values obtained as described above are referred to as accumulated tire damage. The accumulated tire damage shows the damage accumulated on the tire 23T. This is used to estimate, for example, the wear of the tire 23T.

The accumulated tire damage found with the estimating unit 12b is counted for each of the dump trucks 20, or for each of the operators of the dump trucks 20. To count the accumulated tire damage for each of the operators, the accumulated tire damage is counted for each of the operator IDs of each operator. The operator ID is obtained with the operator ID obtaining device 38 illustrated in FIG. 4 and then is transmitted through the vehicle-mounted wireless communication device 27 to the management apparatus 10 illustrated in FIG. 2. Counting the accumulated tire damage for each of the operators can determine the accumulated tire damage caused by each of the operators. Thus, for example, operational guidance can be provided to the operator whose accumulated tire damage has a large value.

The estimating unit 12b can estimate the tire damage DM along a whole path on which the dump truck 20 leaves the travel starting position SPr illustrated in FIG. 5 and moves to the loading position LPr at which the materials are loaded. Alternatively, the estimating unit 12b can estimate the tire damage DM along a whole path on which the dump truck 20 leaves the loading position LPr and moves to the dumping position DPr at which the materials are dumped. Alternatively, the estimating unit 12b can estimate the tire damage DM along a whole path on which the dump truck 20 leaves the travel starting position SPr illustrated in FIG. 5 and moves to the dumping position DPr at which the materials are dumped through the loading position LPr at which the materials are loaded.

Figure 8:
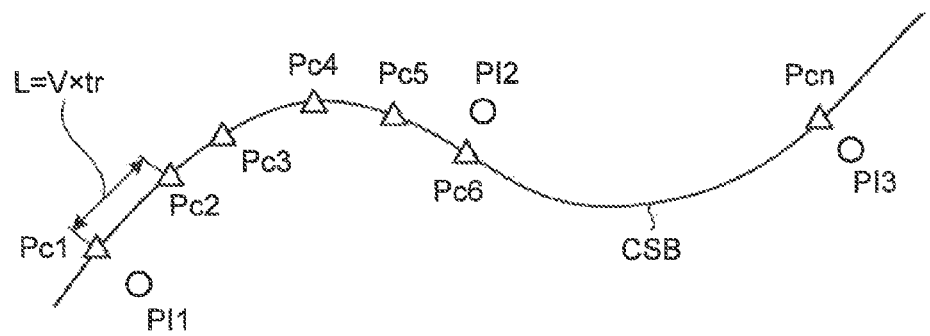
FIG. 8 is an explanatory diagram of an exemplary calculation to find the motion distance of the dump truck with the reference traveling path.

FIG. 8 is an explanatory diagram of an exemplary calculation to find the motion distance of the dump truck 20 according to the reference traveling path CSB. The estimating unit 12b can find the pieces of the positional information Pc1, Pc2, . . . Pcn (n is an integer equal to or higher than one) about the dump truck 20 on the reference traveling path CSB according to the pieces of positional information PI1, PI2, and PI3 on the dump truck 20, and the traveling speed V of the dump truck 20. When the pieces of positional information Pc1, Pc2, . . . Pcn in the reference traveling path CSB are not distinguished from each other, they are collectively referred to as positional information Pc.

For example, the pieces of positional information PI1, PI2, and PI3 are obtained in the vehicle-mounted information collecting device 30 of the dump truck 20 every t1 second(s) and the traveling speed V is obtained every t2 second(s) that is shorter than the t1. The pieces of positional information PI1, PI2, and PI3, and the traveling speed V are transmitted from the dump truck 20 to the management apparatus 10 and are stored in the operation information database 14I of the management-side storage device 13 in the management apparatus 10. The pieces of positional information PI1, PI2, and PI3 on the dump truck 20 are obtained with the GNSS.

The estimating unit 12b reads the pieces of positional information PI1, PI2, and PI3 from the operation information database 14I. The estimating unit 12b selects the pieces of positional information Pc1, Pc6, and Pcn on the reference traveling path CSB that are closest to the pieces of positional information PI1, PI2, and PI3 about the dump truck 20, respectively. The sequential pieces of positional information PI1, PI2, and PI3 about the dump truck 20 are obtained every t1 second(s). It can be assumed that the dump truck 20 travels on the reference traveling path CSB while the pieces of positional information PI1, PI2, and PI3 are obtained. Thus, the estimating unit 12b can find a motion distance L from the traveling speed V and travel time tr of the dump truck 20. The estimating unit 12b can find the pieces of positional information Pc2, Pc3, Pc4, Pc5, and Pcn about the dump truck 20 on the reference traveling path CSB according to the motion distance L.

For example, the coordinates of the position of the dump truck 20 that has traveled by the motion distance L along the reference traveling path CSB from the positional information Pc1 on the reference traveling path CSB indicate the positional information Pc2 about the dump truck 20 on the reference traveling path CSB. The positional information Pc1 corresponds to the positional information PI1 on the dump truck 20. Similarly, the coordinates of the position of the dump truck 20 that has traveled by the motion distance L along the reference traveling path CSB from the positional information Pc2 indicate the positional information Pc3 about the dump truck 20 on the reference traveling path CSB. This can reduce the number of the pieces of positional information PI1, PI2, and PI3 on the dump truck 20 obtained with the GNSS, and thus can reduce the load in the communication via the communication lines.

The operation information about the dump truck 20 to be obtained with the management apparatus 10 is sometimes missed from any cause. For example, if the distributions of frequency of the traveling speed V of a plurality of dump trucks 20 are compared in a cycle in which the materials are loaded on the dump truck 20 and dumped, it is difficult to compare a dump truck having normal information with a dump truck 20 of which operation information is missed. Even if the management apparatus 10 fails to normally obtain the positional information PI about the dump truck 20 obtained with the GNSS and the traveling speed V of the dump truck 20, the assumption that the dump truck 20 has traveled on the reference traveling path CSB enables the estimation of the positional information PI on the dump truck 20.

For example, if the traveling speed V is missed, it is assumed that the dump truck 20 has traveled at a constant speed or at the average traveling speed in a cycle during the period between the positional information PI just before the traveling speed V has been missed and the positional information PI just after the traveling speed V has been restored. On the assumption, the management-side processing device 12 in the management apparatus 10 finds the motion distance based on the positional information Pc on the reference traveling path CSB that is closest to the positional information PI just before the traveling speed V has been missed, and according to the travel time tr and the assumed traveling speed of the dump truck 20. Then, the management-side processing device 12 determines the position away from the positional information Pc as the reference by the motion distance along the reference traveling path CSB as a piece of positional information about the dump truck 20 that has been missed. Repeating the process sequentially can obtain the positional information PI about the dump truck 20 while the traveling speed V has been missed.

If the positional information PI about the dump truck 20 is missed, for example, because of bad reception of the GNSS, it is assumed that the dump truck 20 has traveled at a constant speed or at the average traveling speed in a cycle during the period between the positional information PI just before the positional information PI has been missed and the positional information PI just after the positional information PI has been restored. On the assumption, the management-side processing device 12 in the management apparatus 10 finds the motion distance based on the positional information Pc about the reference traveling path CSB that is closest to the positional information PI just before the positional information PI has been missed, and according to the travel time tr and the assumed traveling speed of the dump truck 20. Then, the management-side processing device 12 determines the position away from the positional information Pc by the motion distance along the reference traveling path CSB as a piece of positional information about the dump truck 20 that has been missed. Repeating the process sequentially can obtain the positional information PI about the dump truck 20 while the positional information PI has been missed.

As described above, by using the reference traveling path CSB, the management apparatus 10 can find the positional information PI that is not obtained even if the pieces of the positional information P1 about the dump truck 20 is few or the positional information PI is missed.

<Generation of Report>

Figure 9:
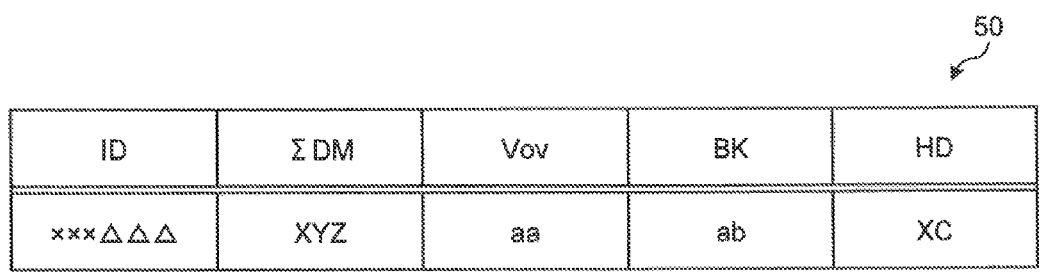
FIG. 9 is a diagram of an exemplary report.

FIG. 9 is a diagram of an exemplary report 50. As described above, the report generating unit 12c in the management apparatus 10 illustrated in FIG. 2 generates a report including the tire damage DM. The report generating unit 12c generates, for example, the report 50 illustrated in FIG. 9. The report 50 includes, for example, the ID of the dump truck 20, the accumulated tire damage ΣDM, the excess speed frequency Vov, the sudden deceleration frequency BK, and the stationary steering frequency HD as the assessment items. The assessment items included in the report 50 are not limited to the example. For example, the report 50 can include the tire damage DM having the largest value instead of the accumulated tire damage ΣDM.

The excess speed frequency Vov is, for example, the number of times that the vehicle speed has exceeded the speed limit on the traveling path in the mine. The sudden deceleration frequency BK is the number of times that the vehicle speed has reduced more largely than a predetermined deceleration. The stationary steering frequency HD is the number of times of stationary steering. The stationary steering is the operation in which the steering wheel is moved when the dump truck 20 stops or travels at a very low speed. The numbers of times are counted with the management-side processing device 12 based on the information collected from the vehicle-mounted information collecting device 30 through the vehicle-mounted wireless communication device 27 and the management-side wireless communication device 18, and are stored in the management-side storage device 13.

All the phenomena indicated in the assessment items damage the tire 23T. The report 50 includes information indicating the frequency of the phenomena that damage the tire 23T. The report 50 in the present embodiment is generated for each of the IDs of the dump trucks 20. This enables the assessment of the damage to the tire 23T of each of the dump trucks 20. Additionally, the report 50 may be generated for each of the IDs of the operators of the dump trucks 20. This is preferable, for example, for operational guidance because the damage to the tire 23T can be assessed for each of the operators.

The report generating unit 12c in the management apparatus 10 may divide the traveling path for the dump truck 20 into a plurality of sections to generate a report that enables the assessment of the damage to the tire 23T at each section. This enables the assessment of the design of the traveling path. The management apparatus 10 may also obtain the combination, for example, of the phenomena that damage the tire 23T and the positional information about the dump truck 20 such that the report generating unit 12c can generate a report based on the obtained information. This enables the management apparatus 10 to notify a manager or the like of when, where, and by which operator which phenomenon has been caused. The manager or the like can use the results in the report, for example, in order to provide operational guidance or improve the traveling path. The phenomena that damage the tire 23T include, for example, stationary steering or sudden deceleration in addition to the damage caused by the travel motion of the dump truck 20 on a corner.

The present embodiment has been described above. However, the present embodiment is not limited to the content of the foregoing description. The components described above include a thing that a person skilled in the art easily supposes, a thing substantially equivalent to the components, and a thing in the range of equivalent. Additionally, the components described above can appropriately be combined. Additionally, each of the components can variously be omitted, replaced, or changed without departing the gist of the present embodiment.

It is not a matter in the present embodiment whether the mining machine is manned or unmanned. It is not a matter in the present embodiment whether the agent that operates the mining machine is an operator or a management system. However, when being provided to a manned mining machine, the present embodiment is effective for the comparison of the driving skills of a plurality of the operators, or the attendance management of the operators. The reference traveling path CSB in the present embodiment is generated with the traveling path calculating unit 12a in the management apparatus 10. However, the generation is not limited to the present embodiment. For example, the designer of a traveling path in the mine can draw a line including the most pieces of positional information PI about the dump truck 20 and then determine the line as the reference traveling path CSB.

REFERENCE SIGNS LIST

1 Mining machine management system
10 Management apparatus
12 Management-side processing device
12a Traveling path calculating unit
12b Estimating unit
12c Report generating unit
13 Management-side storage device
14I Operation information database
14CS Reference traveling path database
18 Management-side wireless communication device
19 Output device
20 Dump truck
21 Vehicle body
22 Vessel
23 Wheel
23T Tire
23H Wheel rim
24 Suspension cylinder
26 Pressure sensor
27 Vehicle-mounted wireless communication device
29 Positional information detecting apparatus
30 Vehicle-mounted information collecting device
31 Vehicle-mounted storage device
32D Steering
33D Steering force detector
34G Engine
34TM Transmission
50 Report
CSB Reference traveling path
DM Tire damage
LD Load

The invention claimed is:

1. A system for managing a mining machine, the system comprising:
a positional information detecting unit included in a mining machine that travels in a mine, and configured to acquire positional information indicating a position of the mining machine;
a pressure sensor configured to measure a load acting on a wheel included in the mining machine;
a traveling path calculating unit configured to obtain, from each of a plurality of mining machines including the mining machine, positional information about an actual traveling path on which each of the mining machines has actually traveled, and to generate a reference traveling path in the mine by approximating a plurality pieces of the obtained positional information; and an estimating unit configured to estimate damage to the wheel included in the mining machine from the positional information about the reference traveling path, an actual traveling speed at which the mining machine has traveled, the load acting on the wheel, and a curvature radius of a curve in the actual traveling path.

2. A system for managing a mining machine, the system comprising:
a positional information detecting unit included in a mining machine that travels in a mine, and configured to acquire positional information indicating a position of the mining machine;
a pressure sensor configured to measure a load acting on a wheel included in the mining machine; and
a reference traveling path storing unit configured to store information about a reference traveling path in the mine, the information being generated by approximating a plurality pieces of positional information that is about actual traveling paths on which a plurality of mining machines including the mining machine actually have traveled and that is detected with the positional information detecting unit; and
an estimating unit configured to estimate damage to the wheel included in the mining machine from the positional information about the reference traveling path, an actual traveling speed at which the mining machine has traveled, the load acting on the wheel, and a curvature radius of a curve in the actual traveling path.

3. The system for managing a mining machine according to claim 1,
wherein when the traveling path calculating unit newly obtains the positional information about the actual traveling path, the traveling path calculating unit regenerates the reference traveling path with the positional information including also the newly obtained positional information about the actual traveling path.

4. The system for managing a mining machine according to claim 1,
wherein the damage is expressed by an expression (1), $$DM = k \times LD \times V^2 / R \quad (1),\text{ and}$$

the DM indicates the damage, the k indicates a constant of proportion, the LD indicates the load acting on the wheel, the V indicates the actual traveling speed, and the R indicates a curvature radius of a curve in the reference traveling path.

5. The system for managing a mining machine according to claim 1,
wherein the estimating unit estimates the damage in a whole path on which the mining machine leaves a first position and moves to a second position at which materials are loaded on the mining machine, or in a whole path on which the mining machine leaves the second position and moves to a third position at which the mining machine dumps the materials.

6. The system for managing a mining machine according to claim 1,
wherein the estimating unit estimates the damage in a whole path on which the mining machine leaves a first position and moves to a third position at which the mining machine dumps materials through a second position at which the materials are loaded on the mining machine.

7. The system for managing a mining machine according to claim 1, the system further comprising:
a report generating unit configured to generate a report about the estimated damage to the wheel.

8. A method for managing a mining machine, the method comprising:
acquiring, with a unit included in a mining machine that travels in a mine, positional information indicating a position of the mining machine;
measuring, with a pressure sensor, a load acting on a wheel included in the mining machine;
obtaining, from each of a plurality of mining machines including the mining machine, positional information about an actual traveling path on which each of the mining machines has traveled, and generating a reference traveling path in the mine by approximating a plurality pieces of the obtained positional information; and
estimating damage to the wheel included in the mining machine from the positional information about the reference traveling path, an actual traveling speed at which the mining machine has traveled, the load acting on the wheel, and a curvature radius of a curve in the actual traveling path.

9. The method for managing a mining machine according to claim 8, further comprising:
regenerating, when the positional information about the actual traveling path is newly obtained, the reference traveling path with the positional information including also the newly obtained positional information about the actual traveling path.

10. The method for managing a mining machine according to claim 9, further comprising:
generating a report about the estimated damage to the wheel.

11. The system for managing a mining machine according to claim 2, the system further comprising:
an estimating unit configured to estimate damage to a wheel included in the mining machine from the positional information about the reference traveling path, an actual traveling speed at which the mining machine has traveled, and a load acting on the wheel.

12. The system for managing a mining machine according to claim 11,
wherein the damage is expressed by an expression (1), $$DM = k \times LD \times V^2 / R \quad (1),\text{ and}$$

the DM indicates the damage, the k indicates a constant of proportion, the LD indicates the load acting on the wheel, the V indicates the actual traveling speed, and the R indicates a curvature radius of a curve in the reference traveling path.

13. The system for managing a mining machine according to claim 12,
wherein the estimating unit estimates the damage in a whole path on which the mining machine leaves a first position and moves to a second position at which materials are loaded on the mining machine, or in a whole path on which the mining machine leaves the second position and moves to a third position at which the mining machine dumps the materials.

14. The system for managing a mining machine according to claim 11,
wherein the estimating unit estimates the damage in a whole path on which the mining machine leaves a first position and moves to a third position at which the mining machine dumps materials through a second position at which the materials are loaded on the mining machine.

15. The system for managing a mining machine according to claim 11, the system further comprising:

a report generating unit configured to generate a report about the estimated damage to the wheel.

* * * * *